(12) United States Patent
Brouard et al.

(10) Patent No.: US 11,881,957 B2
(45) Date of Patent: *Jan. 23, 2024

(54) METHOD FOR DELIVERING DYNAMIC POLICY RULES TO AN END USER, ACCORDING ON HIS/HER ACCOUNT BALANCE AND SERVICE SUBSCRIPTION LEVEL, IN A TELECOMMUNICATION NETWORK

(71) Applicants: Alcatel Lucent, Paris (FR); Alcatel-Lucent USA Inc., Murray Hill, NJ (US)

(72) Inventors: Kim Brouard, Velizy (FR); Thomas Levy, Paris (FR); Yigang Cai, Naperville, IL (US)

(73) Assignees: ALCATEL LUCENT, Paris (FR); NOKIA OF AMERICA CORPORATION, Murray Hill, NJ (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/369,474

(22) Filed: Jul. 7, 2021

(65) Prior Publication Data

US 2021/0399907 A1   Dec. 23, 2021

Related U.S. Application Data

(63) Continuation of application No. 12/879,285, filed on Sep. 10, 2010, now Pat. No. 11,088,859.

(30) Foreign Application Priority Data

Sep. 11, 2009  (EP) ..................... 09305834

(51) Int. Cl.
*H04L 12/00*  (2006.01)
*H04L 12/14*  (2006.01)
(Continued)

(52) U.S. Cl.
CPC .......... *H04L 12/14* (2013.01); *H04L 12/1403* (2013.01); *H04L 12/1467* (2013.01);
(Continued)

(58) Field of Classification Search
CPC . H04L 12/14; H04L 12/1403; H04L 12/1467; H04M 15/00; H04M 15/64;
(Continued)

(56) References Cited

U.S. PATENT DOCUMENTS 7,937,300 B2 *  5/2011  Foottit ................... H04W 4/24
726/1
8,769,098 B2   7/2014  Castro et al.
(Continued)

FOREIGN PATENT DOCUMENTS

CN      1968139 A      5/2007
CN    101047988 A    10/2007
(Continued)

OTHER PUBLICATIONS

RFC 4006, Diameter Credit-Control Application, Network Working Group, Standards Track, Hakala et al., Aug. 2005, 114 pages.
(Continued)

*Primary Examiner* — Khai M Nguyen
(74) *Attorney, Agent, or Firm* — Lippes Mathias LLP

(57) ABSTRACT

The method comprises the steps of:
the Policy and Charging Rules Function (PCRF) receiving (Step 1) user's subscription information, in order to determine an initial policy;
the Policy and Charging Enforcement Function (PCEF) applying (Step 2) the initial rules;
the Policy and Charging Enforcement Function (PCEF) triggering (Step 3) the Extended Online Charging System (EOCS) for the user's service/network resource usage;

(Continued)

the Extended Online Charging System (EOCS) rating and charging (step 4) the user, in real time;

the Extended Online Charging System (EOCS) triggering (Step 5) a change of policy in the Policy and Charging Rules Function (PCRF);

the Policy and Charging Rules Function (PCRF) determining (Step 6) new rules for the new policy;

the Policy and Charging Enforcement Function (PCEF) receiving (Step 7) the new rules and applying them.

24 Claims, 3 Drawing Sheets

(51) Int. Cl.
  *H04W 4/24* (2018.01)
  *H04M 15/00* (2006.01)

(52) U.S. Cl.
  CPC .......... *H04M 15/00* (2013.01); *H04M 15/64* (2013.01); *H04M 15/66* (2013.01); *H04M 15/80* (2013.01); *H04M 15/81* (2013.01); *H04M 15/83* (2013.01); *H04M 15/85* (2013.01); *H04M 15/854* (2013.01); *H04W 4/24* (2013.01)

(58) Field of Classification Search
  CPC ...... H04M 15/66; H04M 15/80; H04M 15/81; H04M 15/83; H04M 15/85; H04M 15/854; H04W 4/24
  See application file for complete search history.

(56) References Cited

U.S. PATENT DOCUMENTS

| | | | |
|---|---|---|---|
| 9,807,248 | B2 | 10/2017 | Wei et al. |
| 11,088,859 | B2 * | 8/2021 | Brouard ................ H04M 15/62 |
| 2006/0008063 | A1 | 1/2006 | Harnesk et al. |
| 2007/0270123 | A1 | 11/2007 | Cai et al. |
| 2008/0046963 | A1 * | 2/2008 | Grayson ................ H04L 67/61 726/1 |
| 2008/0123603 | A1 | 5/2008 | Cai et al. |
| 2008/0229385 | A1 | 9/2008 | Feder et al. |
| 2008/0319884 | A1 | 12/2008 | Yi et al. |
| 2009/0228956 | A1 | 9/2009 | He et al. |
| 2010/0121960 | A1 | 5/2010 | Baniel |
| 2011/0022702 | A1 | 1/2011 | Riley et al. |
| 2011/0022722 | A1 | 1/2011 | Castellanos Zamora et al. |
| 2011/0238547 | A1 | 9/2011 | Belling et al. |
| 2011/0264726 | A1 | 10/2011 | Zabawskyj et al. |
| 2012/0005357 | A1 | 1/2012 | Hellgren |
| 2013/0151710 | A1 * | 6/2013 | D'souza ................ H04L 47/20 709/226 |

FOREIGN PATENT DOCUMENTS

| | | | |
|---|---|---|---|
| CN | 101127694 | A | 2/2008 |
| CN | 101188504 | A | 5/2008 |
| CN | 100395983 | C | 6/2008 |
| CN | 101296096 | A | 10/2008 |
| JP | 2006501781 | A | 1/2006 |
| WO | 2007020499 | | 2/2007 |

OTHER PUBLICATIONS

3GPP TS 23.203, 3rd Generation Partnership Project; Technical Specification Group Services and System Aspects; Policy and Charging Control Architecture (Version 8.5.0), Mar. 2009, 113 pages.

3GPP TR 23.803, 3rd Generation Partnership Project; Technical Specification Group Services and System Aspects; Evolution of Policy Control and Charging (Release 7); V7.0.0, Sep. 2005, 30 pages.

3GPP TS 29.214, 3rd Generation Partnership Project; Technical Specification Group Core Network and Terminals; f Policy Charging Control over Rx Reference Point (Release 8); V8.4.0, Mar. 2009, 40 pages.

3GPP TS 32.240, 3rd Generation Partnership Project; Technical Specification Group Services and System Aspects; Telecommunication Management; Charging Management; Charging Architecture and Principles (Release 8); V8.5.0, Dec. 2008, 44 pages.

3GPP TS 32.251, 3rd Generation Partnership Project; Technical Specification Group Services and System Aspects; Telecommunication Management; Charging Management; Packet Switched (PS) Domain Charging (Release 8); V8.5.0, Mar. 2009, 71 pages.

3GPP TS 32.296, 3rd Generation Partnership Project; Technical Specification Group Services and System Aspects; Telecommunication Management; Charging Management; Online Charging System (OCS); Applications and Interfaces (Release 8); V8.3.0, Mar. 2009, 77 pages.

3GPP TS 32.299, 3rd Generation Partnership Project; Technical Specification Group Services and System Aspects; Telecommunication Management; Charging Management; Diameter Charging Applications (Release 8); V8.6.0, Mar. 2009, 139 pages.

English Bibliography for Chinese Patent Application Publication No. CN1968139A, published May 23, 2007, printed from Derwent Innovation on Oct. 15, 2017, 4 pages.

English Bibliography for Chinese Patent Application Publication No. CN100395983C, published Jun. 18, 2008, printed from Derwent Innovation on Oct. 15, 2017, 4 pages.

English Bibliography for Chinese Patent Application Publication No. CN1188504A, published May 28, 2008, printed from Derwent Innovation on Oct. 15, 2017, 4 pages.

"Digital cellular telecommunications system (Phase 2+); Universal Mobile Telecommunications System (UMTS); LTE; Policy and charging control architecture (3GPP TS 23.203, Version 8.6.0)," Technical Specification, European Telecommunications Standards Institute (ETSI), 650, route Des Lucioles; F-06921 Sophia-Antipolis; France, No. V8.6.0, XP014044524, Jun. 1, 2009.

European Search Report for Application No. 09 30 5834.5, 5 pages.

English Bibliography for Chinese Patent Application Publication No. CN101047988A, published Oct. 3, 2007.

T. Grgic et al., "Policy-based Charging in IMS for Multimedia Services with Negotiable Qos Requirements", Jun. 2009, ConTEL 2009.

English Bibliography for Chinese Patent Application Publication No. CN101127694A, published Feb. 20, 2008, printed from Thomson Innovation on Jan. 8, 2016, 3 pages.

English Bibliography for Chinese Patent Application Publication No. CN101296096A, published Oct. 29, 2008, printed from Thomson Innovation on Jan. 8, 2016, 3 pages.

English Bibliography for Japanese Patent Publication No. JP 2006501781A, published Jan. 12, 2006, printed from Thomson Innovation on Jan. 8, 2016, 4 pages.

\* cited by examiner

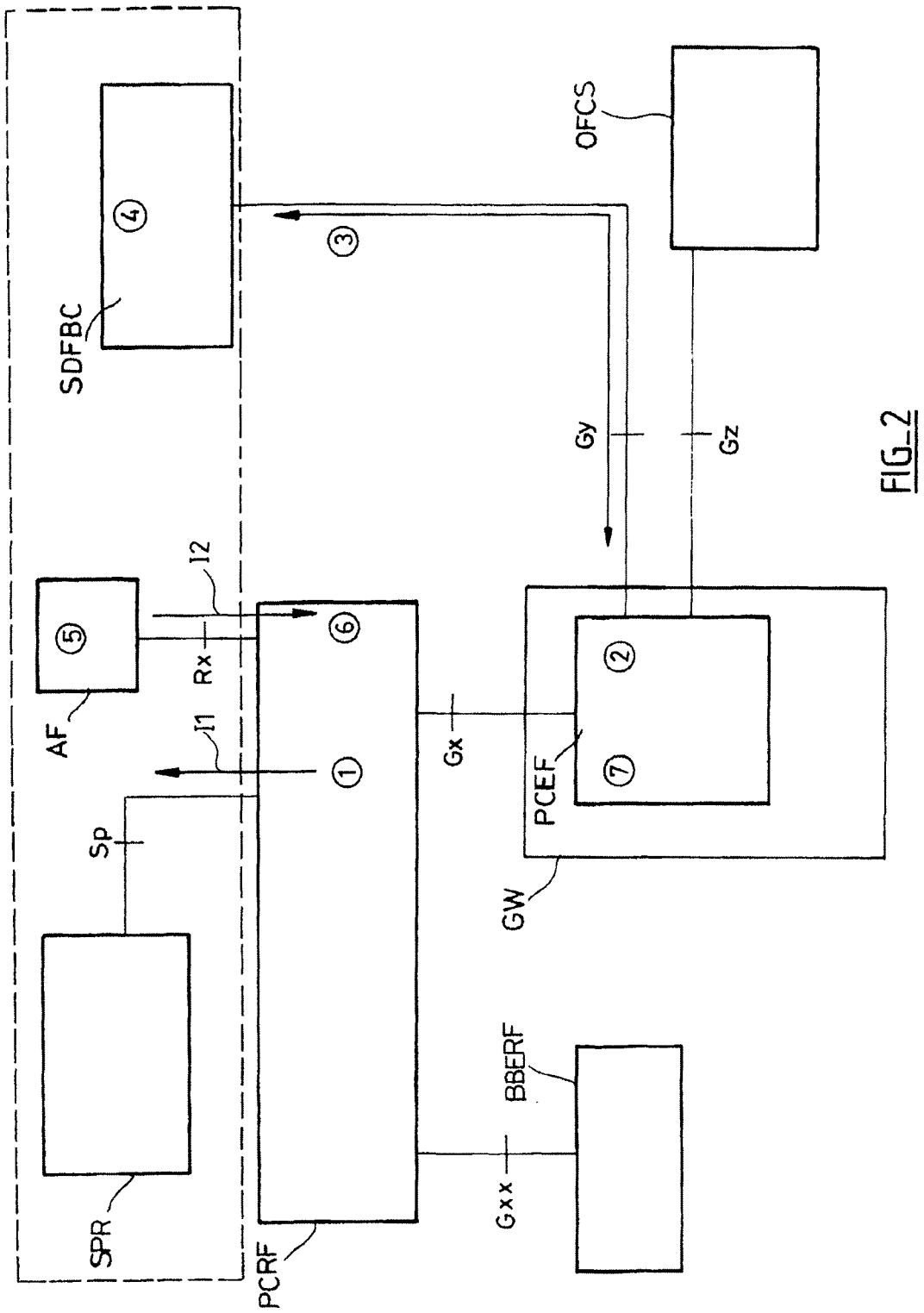
FIG_2

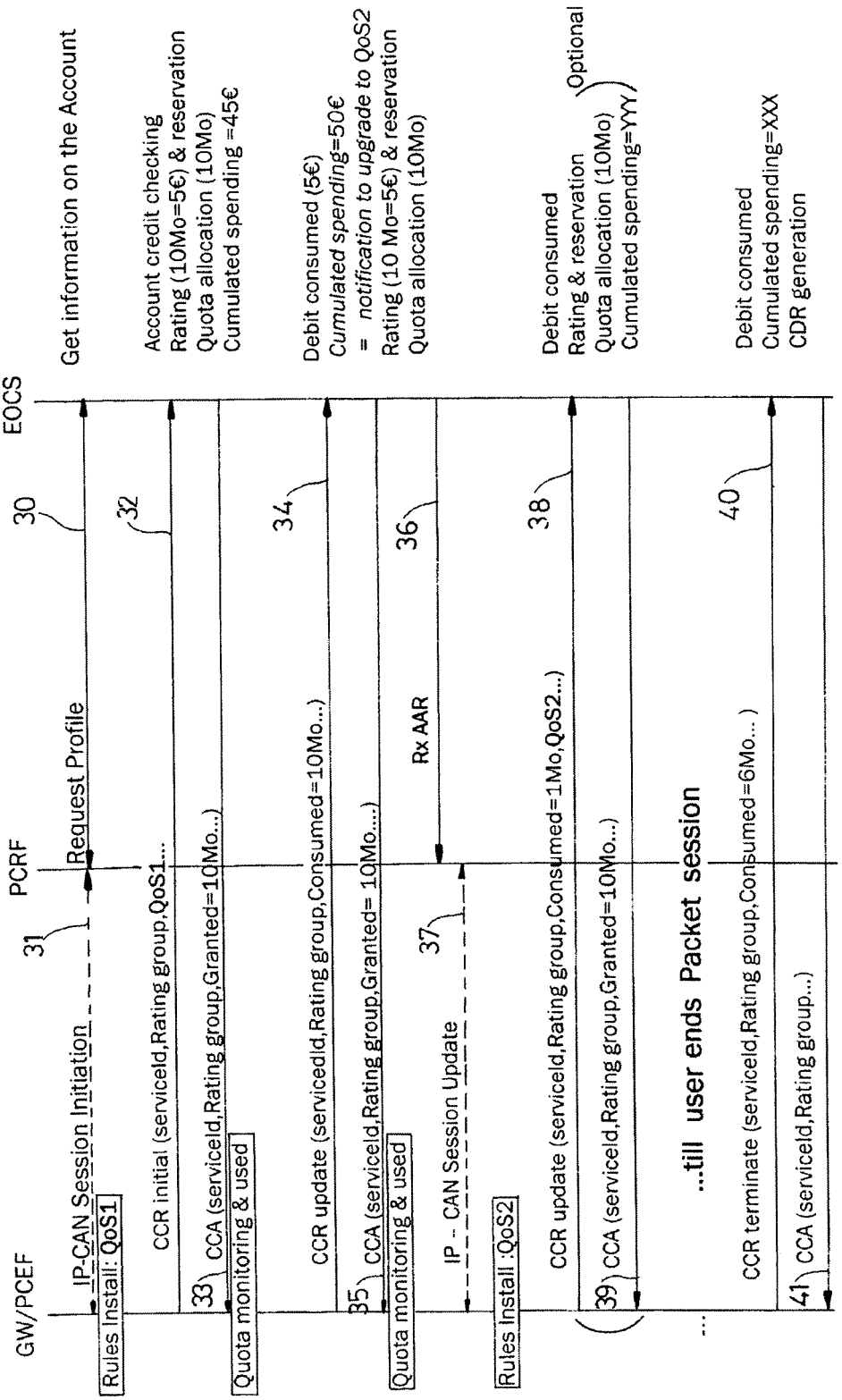

METHOD FOR DELIVERING DYNAMIC POLICY RULES TO AN END USER, ACCORDING ON HIS/HER ACCOUNT BALANCE AND SERVICE SUBSCRIPTION LEVEL, IN A TELECOMMUNICATION NETWORK

This application is a continuation of U.S. patent application Ser. No. 12/879,285, filed Sep. 10, 2010, which claimed priority to and the benefit of European Patent Application No. 09305834.5, filed Sep. 11, 2009. This application claims priority to and the benefit of these earlier filed applications, which are incorporated herein by reference in their entirety.

BACKGROUND OF THE INVENTION

Field of the Invention

The present invention generally relates to a method for delivering dynamic policy rules to an end user, according on his/her account balance and service subscription level, in a telecommunication network, and system for implementing this method. It peculiarly concerns the 3GPP mobile networks. For instance, in a 3G/3G+/LTE mobile telecommunication network, the policy rules may concern the dynamic bandwidth management as a function of the prepaid user's account information (subscription, counters . . . ). For instance, a user's account information may comprise:
1) His/Her Subscription:
   A flat fee bundle for unlimited volume usage for restricted Day/Time intervals (e.g. 10 Euros monthly for this unlimited off-peak bundle). This flat fee is linked with a given restricted quality of service (QoS)/bandwidth.
   An end-of-bundle/out-of-bundle usage with run-on prepaid tariff (e.g. 1 euro/Mb). This tariff is linked with another better QoS/bandwidth.
2) His/Her Loyalty Points/Usage Counters:
   If his/her monthly usage is lower than 500 Mb, for instance, then packet session is linked with a given restricted QoS/bandwidth.
   If his/her monthly usage is greater than 500 Mb, then packet session is linked with a better QoS/bandwidth.
   In a 3G/3G+/LTE mobile telecommunication network, these prepaid account's subscription or data are managed on the Online Charging System (OCS). Indeed, as per 3GPP standard TS 32.296, the OCS handles the Account Balance Management Function (ABMF), by hosting, in a centralized way, these account dynamic data that may change due to multiple simultaneous charging events (calls, short messages, . . . ).

DESCRIPTION OF THE PRIOR ART

The document 3GPP TS 32.296 describes the charging functionality and charging management in 3GPP networks. It covers all internal aspects of the Online Charging System (OCS). The document contains the architecture and functions of the OCS logical components and thereby derives the functionality of the OCS interfaces.

FIG. 1 is a block diagram showing the functional architecture of an embodiment of the policy and charging control function, according to the document 3GPP TS 23.203. It comprises:
an Online Charging System, OCS, comprising a Service Data Flow based Credit Control, SDFBCC;
an Offline Charging System, OFCS;
an application AF;
a Bearer Binding and Event Reporting Function BBERF;
a subscription Profile Repository, SPR;
a Policy and Charging Rules Function PCRF;
a gateway GW comprising a Policy and Charging Enforcement Function, PCEF.

A Gxx reference point resides between the Policy and Charging Rules Function PCRF and the Bearer Binding and Event Reporting Function BERF.

The Gxx reference point is used for:
Provisioning, update and removal of QoS rules from the PCRF to the BBERF.
Transmission of traffic plane events from the BBERF to the PCRF.
Transmission of events reported by the PCEF to the BBERF via the PCRF.

The Gxx reference point enables a PCRF to have dynamic control over the BBERF behaviour. The Gxx reference point enables the signalling of QoS control decisions and it supports the following functions:
Establishment of Gxx session by BBERF.
Termination of Gxx session by BBERF or PCRF.
Establishment of Gateway Control Session by the BBERF.
Termination of Gateway Control Session by the BBERF or PCRF.
Request for QoS decision from BBERF to PCRF.
Provision of QoS decision from PCRF to BBERF;
Delivery of Internet Protocol Connectivity Access Network (IP-CAN) specific parameters from PCRF to BBERF or from BBERF to PCRF.
Negotiation of IP-CAN bearer establishment mode (UE-only and UE/NW).

A QoS control decision consists of zero or more QoS rule(s) and IP-CAN attributes. A Gxx session serves as a channel for communication between the BBERF and the PCRF.

A Gx reference point resides between the PCRF and the PCEF. The Gx reference point enables a PCRF to have dynamic control over the Policy Charging Control (PCC) behaviour at a PCEF. The Gx reference point enables the signalling of PCC decision, which governs the PCC behaviour, and it supports the following functions:
Request for PCC decision from PCEF to PCRF.
Provision of PCC decision from PCRF to PCEF.
Delivery of Internet Protocol Connectivity Access Network (IP-CAN) specific parameters from PCRF to PCEF, or from PCEF to PCRF; this applies only when Gxx is deployed.
Negotiation of IP-CAN bearer establishment mode.
Termination of Gx session (corresponding to an IP-CAN session) by PCEF or PCRF.

A PCC decision consists of zero or more PCC rule(s) and IP-CAN attributes.

A Gy reference point resides between the Charging Enforcement Function PCEF and the Service Data Flow based Credit Control SDFBCC. The Gy reference point allows online credit control for service data flow based charging. The functionalities required across the Gy reference point are defined in 3GPP TS 32.251 [9] and is based on RFC 4006 [4].

A Gz reference point resides between the Charging Enforcement Function PCEF and the Offline Charging System POFCS. The Gz reference point enables transport of service data flow based offline charging information. The Gz interface is specified in TS 32.240 [3].

A Sp reference point resides between the Policy and Charging Rules Function PCRF and the Subscription Profile Repository SPR. The Sp reference point allows the PCRF to request subscription information related to the IP-CAN transport level policies from the SPR based on a subscriber ID, a PDN (Packet Data Network) identifier and possible further IP-CAN session attributes. The Sp reference point allows the SPR to notify the PCRF when the subscription information has been changed if the PCRF has requested such notifications. The SPR shall stop sending the updated subscription information when a cancellation notification request has been received from the PCRF.

An Rx reference point resides between the Policy and Charging Rules Function PCRF and the Application Function AF. This reference point enables transport of application level session information from AF to PCRF.

Such information includes, but is not limited to:
IP filter information to identify the service data flow, for policy control and/or differentiated charging.
Media/application bandwidth requirements for QoS control.

The Rx reference point enables the AF subscription to send notifications on signalling path status of AF session in the IP-CAN.

The application of a policy at the starting of a session is supported thanks to a request Sp to the Subscription Profile Repository SPR.

The notification of a policy change during a session is supported, at the request of the application function AF, by a request Rx (P-CSEF request, video or multimedia application requests, etc. . . . ). But the notification of a policy change is not supported when user's account counters change. Thus, there is a need to provide a technical solution for notification of a policy change when user's account counters change.

This can be solved by applying, the method and the system according to the invention.

SUMMARY OF THE INVENTION

The object of the invention is a method for delivering dynamic policy rules to an end user, according on his/her account balance and service subscription level, in a telecommunication network comprising:
a Policy and Charging Rules Function,
a Policy and Charging Enforcement Function,
an Extended Online Charging System;
characterized in that it comprises the steps of:
the Policy and Charging Rules Function receiving user's subscription information, in order to determine an initial policy;
the Policy and Charging Enforcement Function applying the initial rules;
the Policy and Charging Enforcement Function triggering the Extended Online Charging System for the user's service/network resource usage;
the Extended Online Charging System rating and charging the user, in real time;
the Extended Online Charging System triggering a change of policy in the Policy and Charging Rules Function;
the Policy and Charging Rules Function determining new rules for the new policy;
the Policy and Charging Enforcement Function receiving the new rules and applying them.

Thanks to this method, there is an interface between the Online Charging System and the Policy and Charging Rules Function, in order to perform Online Charging System server-initiated notification towards the Policy and Charging Rules Function of any change in policy in the network resource management, due to account's data changes controlled by the Online Charging System.

Another object of the invention is a system for implementing the method according to the invention.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 2 is a block diagram showing the functional architecture of an embodiment of the policy and charging control function, according to the invention.

FIG. 3 shows a signaling flow in the embodiment represented on FIG. 2.

DETAILED DESCRIPTION OF THE PREFERRED EMBODIMENTS

Figure 1:
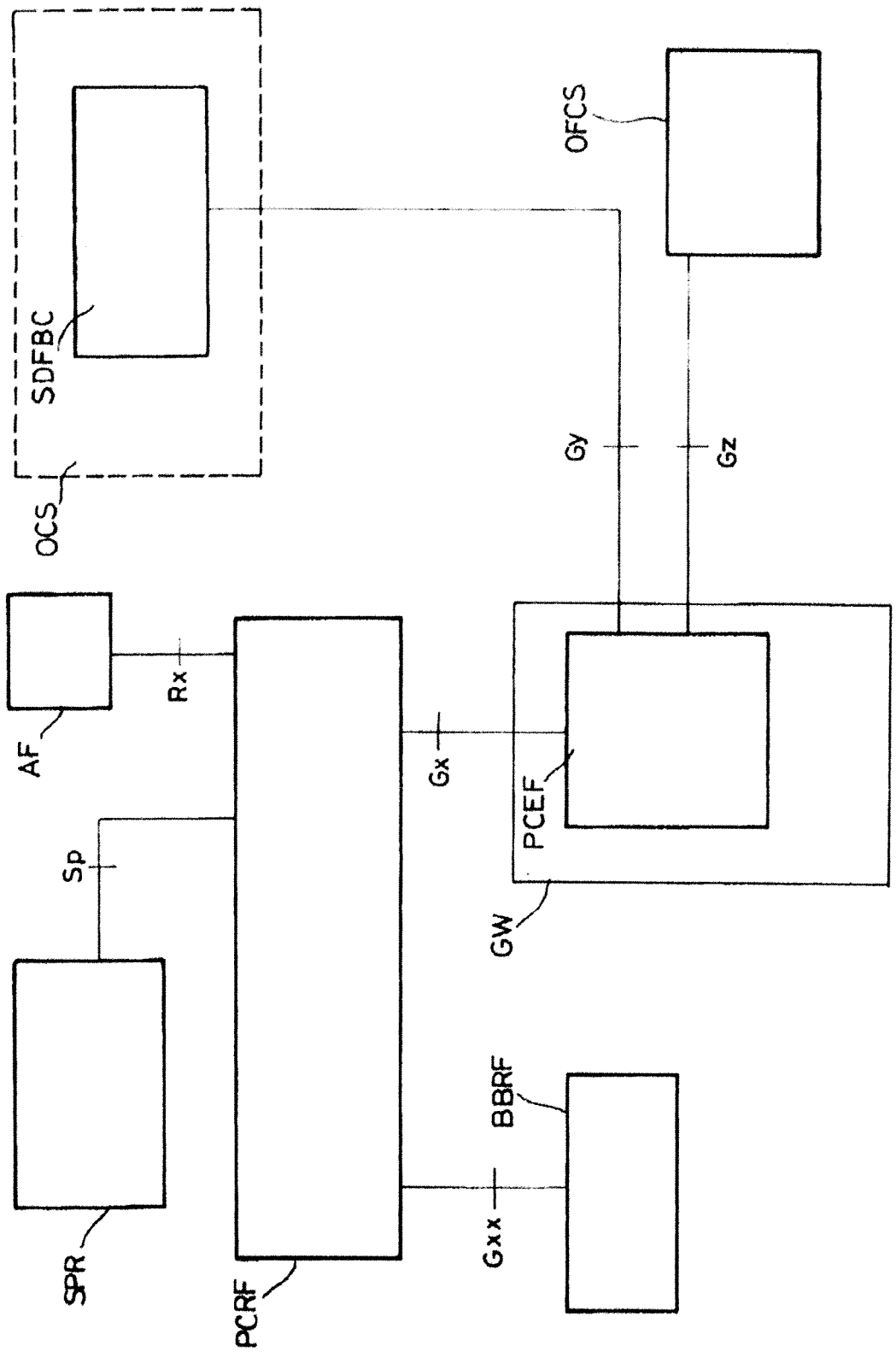
FIG. 1, described above, is a block diagram showing the functional architecture of an embodiment of the policy and charging control function, according to the document 3GPP TS 23.203.

FIG. 2 is a block diagram showing the functional architecture of an embodiment of the policy and charging control function, according to the invention. It comprises, as the known embodiment described above:
an Extended Online Charging System, EOCS, comprising:
a Service Data Flow Based Credit Control, SDFBC, similar to the classical one,
a Subscription Profile Repository, SPR, which is extended based on ABMF. Subscriber charge/payment plan, tariff index will be mapped in the subscriber profile to be downloaded to PCRF
and an application function AF, such as a notification application function for baring/unbarring the service access, usage, change of policies;
an Offline Charging System, OFCS;
a Bearer Binding and Event Reporting Function BBERF similar to the classical one;
a Policy and Charging Rules Function PCRF similar to the classical one;
a gateway GW comprising a Policy and Charging Enforcement Function PCEF similar to the classical one.

The reference point Gy is used as usual for rating and charging. However there are two supplementary interfaces:
A first interface (optional) I1 that is similar to the classical reference point Sp, in order to get user's subscription (QoS information) from the Subscription Profile Repository SPR to the Policy and Charging Rules Function PCRF, upon user's subscription; and to transmit data from the Extended Online Charging System OCS SPR function to the Policy and Charging Rules Function PCRF, at the start of a packet session establishment for initial policy/QoS application. I1 transfers user subscription and charging plan index from SRF of the EOCS to PCRF A second interface I2 that is Rx interface like, to be enhanced with policy information such as QoS level, in order to transmit any change of charging/payment plan due to service change and subscriber counter change beyond a threshold preset at EOCS, upon user's subscription data change, from the Online Charging System OCS to the Policy and Charging Rules Function PCRF for PCC rule change, during a packet session. Then this notification is forwarded from the Policy and Charging Rules Function PCRF to the Policy and Charging Enforcement Function PCEF via Gx reference point, for enforcement.

In this embodiment, the method comprises the following steps:

Step 1: The Policy and Charging Rules Function PCRF requests user's subscription and charging/payment information, from the Subscription Profile Repository, SPR, in the Extended Online Charging System EOCS, via the interface I1, in order to determine an initial policy. This step 1 is optional as the Policy and Charging Rules Function PCRF can request this subscription data from an external Subscription Profile Repository, such as an existing Subscription Profile Repository in an existing Home Subscriber Server (HSS) in the operator's network. For example, in some 3G/3G+ networks, the HSS is not mandatory/present, thus the Extended Online Charging System EOCS shall provide the SPR function.

Step 2: The Policy and Charging Enforcement Function PCEF applies the initial rules corresponding to the initial policy supplied by the PCRF.

Step 3: The Policy and Charging Enforcement Function PCEF triggers the Service Data Flow Based Credit Control, SDFBC, in the Extended Online Charging System EOCS, for the user's service/network resource usage charging.

Step 4: The Service Data Flow Based Credit Control, SDFBC, rates and charges the user, in real time. SDFBC successfully answers to the PCEF by allocating a service units quota (shall it be volume units, time units or specific service units for the given service, please refer to the TS 32.299 for the Credit Control Charging application) to enable the service authorization in the network. When receiving the quota allocation, the Policy and Charging Enforcement Function PCEF shall monitor the quota usage and any service change or addition in the network (could be based on threshold rules set from PCRF). The Policy and Charging Enforcement Function PCEF shall update the Extended Online Charging System EOCS for any counters and rating conditions change.

At a given time, during the current session, user's counters or rating conditions are changed.

Step 5: In the Extended Online Charging System EOCS, the Application Function AF triggers a change of policy in the Policy and Charging Rules Function PCRF, via the interface I2.

Step 6: The Policy and Charging Rules Function PCRF determines new rules corresponding to the new policy.

Step 7: The Policy and Charging Enforcement Function PCEF receives the new rules and applies them, and updates IP-CAN session. It optionally updates charging conditions.

The Policy and Charging Enforcement Function service logic is enhanced to manage this new policy change due to the Extended Online Charging System policy notification via the Policy and Charging Rules Function PCRF, and along with the Internet Protocol Connectivity Access Network session update.

FIG. 3 shows the signaling flow in the embodiment represented on FIG. 2. It comprises the following steps:

Step 30: The Policy and Charging Rules Function PCRF requests the user's profile along with user's payment plans, from either the Extended Online Charging System EOCS, or an external Subscription Profile Repository, or both, in order to get user's subscription and payment information. This subscription information shall enable the Policy and Charging Rules Function PCRF to determine the initial rules for both policy control and charging.

Step 31: The Policy and Charging Rules Function PCRF then initiates the Internet Protocol Connectivity Access Network (IP-CAN) session establishment with the initial rules via the Policy and Charging Enforcement Function PCEF/Bearer Binding and Event Reporting Function BBERF as per the TS 32.203. Initial rules QoS1 are then applied to initialize the IP-CAN session.

Step 32: The Policy and Charging Enforcement Function PCEF sends a Credit Control Request, CCR initial, to the Extended Online Charging System EOCS in order to trigger the Online Charging System OCS for the user's service/network resource usage, with all the service request related information (serviceId, Rating group, QoS1 . . . ).

Step 33: The Extended Online Charging System EOCS performs online charging operation to authorize the service usage:
  check the account credit,
  rate (e.g. 10 Mo=5€) & reserve (cost),
  allocate a quota (e.g. 10 Mo),
  calculate the cumulated spending (e.g. 45 €), and sends a Credit Control Answer, CCA (serviceId, Rating group, Granted=10 Mo . . . ), to the Policy and Charging Enforcement Function PCEF in order to enable the service usage and monitoring.

The Policy and Charging Enforcement Function PCEF shall monitor the allocated quota usage and any service change or addition in the network. It shall update and report to the Extended Online Charging System EOCS for any used counters and rating conditions change. It will also update and report to the Extended Online Charging System EOCS per thresholds charging rules from the Policy and Charging Rules Function PCRF, as some of them are defined by the Subscription Profile Repository SPR of the Extended Online Charging System EOCS and relayed to the Policy and Charging Rules Function PCRF in Step 30.

Step 34: The Policy and Charging Enforcement Function PCEF sends a Credit Control Update CCR update (serviceId, Rating group, Consumed=10 Mo . . . ) to the Service Data Flow Based Credit Control SDFBC in the Extended Online Charging System EOCS, in order to make it:
  calculate the consumed debit (e.g. 5 €),
  calculate the cumulated spending (e.g. 50 €),
  upgrade to QoS2,
  apply a rating (e.g. 10 Mo=5 €) and a reservation,
  and make a new quota allocation (e.g. 10 Mo).
  The Extended Online Charging System EOCS manages also any change in the rating and user's counters rules to apply and notify any new tariff/policy in the network resources accordingly.

Step 35: The Extended Online Charging System EOCS sends a Credit Control Answer CCA (serviceId, Rating group, Granted=10 Mo . . . ), to the Policy and Charging Enforcement Function PCEF to enable the service usage. The Charging Enforcement Function PCEF shall update and report to the Extended Online Charging System EOCS for any used counters and rating conditions change.

Step 36: When processing the step 34 operation, the Extended Online Charging System EOCS detects a change in QoS (e.g. QoS2) to provide to the user's packet service session.

The application Function AF, in the Extended Online Charging System EOCS, sends a RX MR (Authentication Authorization Request) to the Policy and Charging Rules Function PCRF in order to enable a session update. Rxx AAR should include subscriber identifier, IP-CAN session identifier, GW identifier, and charging rule change index which will point to subscriber charging data (counter and plan) changes triggered by CCR[update] received from the Policy and Charging Enforcement Function PCEF (at Step 34).

The Policy and Charging Rules Function PCRF uses the charging rule change index received from Rx AAR and determines new policy and charging rules for IP-CAN session. The Policy and Charging Rules Function PCRF responses Rx MA (Authentication Authorization Answer) to the Online Charging System EOCS. The Policy and Charging Rules Function PCRF sends new request via Gx reference point to PCEF/BBERF in order to update the Internet Protocol Connectivity Access Network IP-CAN session.

Step 37:

The enhanced Policy and Charging Enforcement Function PCEF service logic manage new request of the Policy Charging Control PCC change from the Policy and Charging Rules Function PCRF due to the Online Charging System EOCS notification via the Policy and Charging Rules Function PCRF, and executes the IP-CAN session update.

Step 38: The Policy and Charging Enforcement Function PCEF sends a CCR update (serviceId, Rating group, Consumed=1 Mo, QoS2 . . . ) to the Extended Online Charging System EOCS to update the rating condition change related to the QoS change.

Step 39: The Extended Online Charging System EOCS shall manage the new rating rules to apply a new tariff accordingly.

Step 40: When the user ends the packet session, the Policy and Charging Enforcement Function PCEF sends a Credit Control Request, CCR terminate (serviceId, Rating group, Consumed=6 Mo . . . ), to the Extended Online Charging System EOCS, in order to terminate the charging process:

Debit the last consumed units.

Update the counters (the cumulated spending=XXX).

Generate the CDR.

Step 41: The Extended Online Charging System EOCS sends a Credit Control Answer, CCA (serviced, Rating group . . . ), to the Extended Online Charging System EOCS to acknowledge the end of the user's session.

The steps 38-39 are the generic Diameter Credit Control Application (as per the TS 32.299 and TS 32.251). Anyhow they can be optional as there may be or not intermediate CCR/CCA requests exchanges between the Policy and Charging Enforcement Function PCEF and the Extended Online Charging System EOCS along till the end of the user's session.

The invention claimed is:

1. An extended online charging system (EOCS) for a telecommunication system to facilitate dynamic management of policy rules for an end user of the telecommunication system during a communication session, the EOCS comprising:

at least one processor and at least one memory including computer program code;

at least one first communication interface configured for communications between the EOCS and a policy and charging rules function (PCRF) of the telecommunication system; and at least one second communication interface configured for communications between the EOCS and a policy and charging enforcement function (PCEF) of the telecommunication system;

wherein the at least one processor, the at least one memory, the computer program code, and the at least one second communication interface are configured to receive a credit request from the PCEF for allocation of service units to a subscriber account associated with a communication session during the communication session;

wherein the at least one processor, the at least one memory, the computer program code, and the at least one second communication interface are configured to send a credit answer with an allocation of service units for the subscriber account to the PCEF during the communication session in response to the credit request, wherein the PCEF monitors usage of the allocated service units during the communication session;

wherein the at least one processor, the at least one memory, the computer program code, and the at least one second communication interface are configured to receive a report on usage of the allocated service units from the PCEF during the communication session;

wherein the at least one processor, the at least one memory, and the computer program code are configured to determine a policy/rule change is needed for the subscriber account based at least in part on the report from the PCEF;

wherein the at least one processor, the at least one memory, the computer program code, and the at least one first communication interface are configured to send a notification of policy change for the subscriber account to the PCRF during the communication session after determining the policy/rule change is needed, wherein the notification of policy change for the subscriber account indicates the policy/rule change is needed and triggers a process for determining the policy/rule change for the subscriber account at the PCRF.

2. The EOCS of claim 1 wherein the at least one processor, the at least one memory, the computer program code, and the at least one first communication interface are configured to receive a profile request for the subscription information associated with an end user of the telecommunication system from the PCRF;

wherein the at least one processor, the at least one memory, the computer program code, and the at least one first communication interface are configured to send the subscription information in the subscriber account associated with the end user to the PCRF in response to the profile request, wherein the PCRF determines an initial policy and initial rules for the communication session based at least in part on the subscription information and provides the initial rules to the PCEF, wherein the PCEF applies the initial rules to the communication session associated with the subscriber account.

3. The EOCS of claim 2, further comprising:
a subscription profile repository (SPR);
wherein the at least one first communication interface comprises a supplementary interface;
wherein the SPR is configured to send the subscription information to the PCRF via the supplementary interface.

4. The EOCS of claim 1 wherein the at least one processor, the at least one memory, and the computer program code are configured to determine a counter associated with usage of the allocated service units for the subscriber account has changed based at least in part on the report from the PCEF, wherein the determining the policy/rule change is needed is in conjunction with the change to the counter for the subscriber account.

5. The EOCS of claim 1 wherein the PCRF determines new rules for the subscriber account during the communication session based at least in part on the notification of policy change for the subscriber account;
wherein the PCRF sends the new rules for the subscriber account to the PCEF;
wherein the PCEF applies the new rules for the subscriber account to the communication session.

6. The EOCS of claim 1, further comprising:
a service data flow based credit control (SDFBC) configured to receive the credit request from the PCEF, to send the credit answer to the PCEF, and to determine the policy rule change is needed.

7. The EOCS of claim 1, further comprising:
an application function (AF);
wherein the at least one first communication interface comprises a supplementary interface;
wherein the AF is configured to send the notification of policy change to the PCRF via the supplementary interface.

8. A method for delivering dynamic policy rules for an end user of a telecommunication system during a communication session, comprising:
receiving a credit request for allocation of service units to a subscriber account associated with a communication session during the communication session from a policy and charging enforcement function (PCEF) of the telecommunication system at an extended online charging systems (EOCS) of the telecommunication system;
sending a credit answer with an allocation of service units for the subscriber account from the EOCS to the PCEF during the communication session in response to the credit request, wherein the PCEF monitors usage of the allocated service units during the communication session;
receiving a report on usage of the allocated service units from the PCEF at the EOCS during the communication session;
determining a policy/rule change is needed for the subscriber account based at least in part on the report from the PCEF;
sending a notification of policy change for the subscriber account from the EOCS to the PCRF during the communication session after determining the policy/rule change is needed, wherein the notification of policy change for the subscriber account indicates the policy/rule change is needed and triggers a process for determining the policy/rule change for the subscriber account at the PCRF.

9. The method of claim 8, further comprising:
receiving a profile request for the subscription information associated with an end user of the telecommunication system from the PCRF at the EOCS; and
sending the subscription information in the subscriber account associated with the end user from the EOCS to the PCRF in response to the profile request, wherein the PCRF determines an initial policy and initial rules for the communication session based at least in part on the subscription information and provides the initial rules to the PCEF, wherein the PCEF applies the initial rules to the communication session associated with the subscriber account.

10. The method of claim 9, wherein the EOCS includes a subscription profile repository (SPR), the method further comprising:
sending the subscription information from the SPR to the PCRF.

11. The method of claim 8, further comprising:
determining a counter associated with usage of the allocated service units for the subscriber account has changed based at least in part on the report from the PCEF, wherein the determining the policy/rule change is needed is in conjunction with the change to the counter for the subscriber account.

12. The method of claim 8 wherein the PCRF determines new rules for the subscriber account during the communication session based at least in part on the notification of policy change for the subscriber account;
wherein the PCRF sends the new rules for the subscriber account to the PCEF;
wherein the PCEF applies the new rules for the subscriber account to the communication session.

13. The method of claim 8, wherein the EOCS includes a service data flow based credit control (SDFBC), the method further comprising:
receiving the credit request from the PCEF at the SDFBC;
sending the credit answer from the SDFBC to the PCEF; and
determining the policy rule change is needed at the SDFBC.

14. The method of claim 8, wherein the EOCS includes an application function (AF), the method further comprising:
sending the notification of policy change from the AF to the PCRF.

15. A policy and charging rules function (PCRF) for a telecommunication system to facilitate dynamic management of policy rules for an end user of the telecommunication system during a communication session, the PCRF comprising:
at least one processor and at least one memory including computer program code;
at least one first communication interface configured for communications between the PCRF and an extended online charging system (EOCS) of the telecommunication system; and
at least one second communication interface configured for communications between the PCRF and a policy and charging enforcement function (PCEF) of the telecommunication system;
wherein the PCEF sends a credit request to the EOCS for allocation of service units to a subscriber account associated with a communication session during the communication session;
wherein PCEF receives a credit answer from the EOCS with an allocation of service units for the subscriber account during the communication session;

wherein the PCEF monitors usage of the allocated service units during the communication session and sends a report on usage of the allocated service units to the EOCS during the communication session;

wherein the report from the PCEF is to be used by the EOCS to determine a policy/rule change is needed for the subscriber account;

wherein the at least one processor, the at least one memory, the computer program code, and the at least one first communication interface are configured to receive a notification of policy change for the subscriber account from the EOCS during the communication session, wherein the notification of policy change for the subscriber account indicates the policy/rule change is needed;

wherein the at least one processor, the at least one memory, and the computer program code are configured to determine the policy/rule change for the subscriber account in response to the notification of policy change.

16. The PCRF of claim 15 wherein the at least one processor, the at least one memory, the computer program code, and the at least one first communication interface are configured to send a profile request for the subscription information associated with an end user of the telecommunication system to the EOCS;

wherein the at least one processor, the at least one memory, the computer program code, and the at least one first communication interface are configured to receive the subscription information in the subscriber account associated with the end user from the EOCS in response to the profile request;

wherein the at least one processor, the at least one memory, and the computer program code are configured to determine an initial policy and initial rules for the communication session based at least in part on the subscription information;

wherein the at least one processor, the at least one memory, the computer program code, and the at least one second communication interface are configured to provide the initial rules to the PCEF, wherein the PCEF applies the initial rules to the communication session associated with the subscriber account.

17. The PCRF of claim 15 wherein the EOCS determines a counter associated with usage of the allocated service units for the subscriber account has changed based at least in part on the report from the PCEF, wherein the determining the policy/rule change is needed by the EOCS is in conjunction with the change to the counter for the subscriber account.

18. The PCRF of claim 15 wherein the at least one processor, the at least one memory, and the computer program code are configured to determine new rules for the subscriber account during the communication session based at least in part on the notification of policy change for the subscriber account;

wherein the at least one processor, the at least one memory, the computer program code, and the at least one second communication interface are configured to send the new rules for the subscriber account to the PCEF;

wherein the PCEF applies the new rules for the subscriber account to the communication session.

19. The PCRF of claim 15 wherein an initial policy for the communication session includes an initial quality of service (QoS) level rule and the policy/rule change determined by the PCRF includes a change from the initial QoS level rule to a new QoS level rule.

20. A method for delivering dynamic policy rules for an end user of a telecommunication system during a communication session, comprising:

providing a policy and charging rules function (PCRF) in the telecommunication system, wherein the PCRF is configured to communicate with a policy and charging enforcement function (PCEF) of the telecommunication system and an extended online charging system (EOCS) of the telecommunication system, wherein the PCEF sends a credit request to the EOCS for allocation of service units to a subscriber account associated with a communication session during the communication session, wherein the EOCS sends a credit answer with an allocation of service units for the subscriber account to the PCEF during the communication session in response to the credit request, wherein the PCEF monitors usage of the allocated service units during the communication session and sends a report on usage of the allocated service units to the EOCS during the communication session, wherein the EOCS determines a policy/rule change is needed for the subscriber account based at least in part on the report from the PCEF;

receiving a notification of policy change for the subscriber account from the EOCS at the PCRF during the communication session after the EOCS determines the policy/rule change is needed, wherein the notification of policy change for the subscriber account indicates the policy/rule change is needed; and determining the policy/rule change for the subscriber account in response to the notification of policy change.

21. The method of claim 20, further comprising:

sending a profile request for the subscription information associated with an end user of the telecommunication system from the PCRF to the EOCS;

receiving the subscription information in the subscriber account associated with the end user from the EOCS at the PCRF in response to the profile request;

determining an initial policy and initial rules for the communication session based at least in part on the subscription information; and providing the initial rules from the PCRF to the PCEF, wherein the PCEF applies the initial rules to the communication session associated with the subscriber account.

22. The method of claim 20 wherein the EOCS determines a counter associated with usage of the allocated service units for the subscriber account has changed based at least in part on the report from the PCEF, wherein the determining the policy/rule change is needed by the EOCS is in conjunction with the change to the counter for the subscriber account.

23. The method of claim 20, further comprising:

determining new rules for the subscriber account during the communication session based at least in part on the notification of policy change for the subscriber account from the EOCS; and sending the new rules for the subscriber account from the PCRF to the PCEF, wherein the PCEF applies the new rules for the subscriber account to the communication session.

24. The method of claim 20 wherein an initial policy for the communication session includes an initial quality of service (QoS) level rule and the policy/rule change determined by the PCRF includes a change from the initial QoS level rule to a new QoS level rule.

\* \* \* \* \*